(12) United States Patent
Ogasawara et al.

(10) Patent No.: US 6,762,885 B1
(45) Date of Patent: Jul. 13, 2004

(54) HEAD-MOUNTED DISPLAY

(75) Inventors: Yuji Ogasawara, Hachioji (JP); Etsuyasu Kondo, Hino (JP)

(73) Assignee: Olympus Corporation (JP)

( * ) Notice: Subject to any disclaimer, the term of this patent is extended or adjusted under 35 U.S.C. 154(b) by 76 days.

(21) Appl. No.: 10/031,376

(22) PCT Filed: Aug. 14, 2000

(86) PCT No.: PCT/JP00/05437
§ 371 (c)(1),
(2), (4) Date: Jan. 18, 2002

(87) PCT Pub. No.: WO01/17239
PCT Pub. Date: Mar. 8, 2001

(30) Foreign Application Priority Data

Aug. 26, 1999 (JP) .................................. H11-240062

(51) Int. Cl.[7] ............................. G02B 27/14; G09G 5/00
(52) U.S. Cl. .......................................... 359/630; 345/8
(58) Field of Search ............................... 359/630, 631, 359/632, 618; 345/7, 8, 87, 102, 123, 158; 349/11, 15, 59; 351/209, 210, 123, 158

(56) References Cited

U.S. PATENT DOCUMENTS 5,181,051 A * 1/1993 Townsend et al. ............ 351/52
6,351,252 B1 * 2/2002 Atsumi et al. ................. 345/8
6,424,321 B1 * 7/2002 Ronzani et al. ................ 345/8

FOREIGN PATENT DOCUMENTS

JP 10-293544 * 4/1998

* cited by examiner

*Primary Examiner*—Georgia Epps
*Assistant Examiner*—Jack Dinh
(74) *Attorney, Agent, or Firm*—William H. Bollman

(57) ABSTRACT

A head-mounted image display device consists mainly of an image producing unit (2), right and left frames (27 and 25), and a controller (8). The image producing unit has image display LCDs enclosed with covers (11 and 12). The right and left frames useful in wearing the head-mounted image display device HMD on the head are supported by frame supports (17 and 16) that are fixed to the cover (11). Herein, the right and left frames are detachably attached to the frame supports. An earphone cord (21 or 20) is guided along ribs which are formed on the outer surface of the right or left frame. An earphone (7 or 6) is detachably attached to an earphone holder formed in the distal or rear portion of the right or left frame. Thus, there is provided a head-mounted image display device that is compact, that can be readily worn on the head, and that not only enables viewing of a display screen image but also simplifies observation of an ambient environment.

6 Claims, 13 Drawing Sheets

HEAD-MOUNTED DISPLAY

TECHNICAL FIELD

The present invention relates to a head-mounted display device including an optical system that projects an image, which is produced by a built-in image display means, on the observer's retinas.

BACKGROUND ART

Various types of head-mounted image display devices have been proposed as compact display devices that are worn on the head and display an image directly viewable with the eyes.

For example, Japanese Patent Unexamined Publication No. 10(1998)-293544 has disclosed a head-mounted image display device that consists mainly of a display casing, right and left supporting frames, a nose rest member, head pressing members, and ear rest members. The display casing accommodates LCDs and others. The right and left supporting frames are borne by joint members, which are detachably attached to the display casing, so that the right and left supporting frames can pivot on the joint members. The nose rest member is fixed to the display casing. The head pressing members are attached to the supporting frames so that they can slide. The ear rest members are attached to the head pressing members so that they can move together with the head pressing members. The operability of the head-mounted image display device for activating various kinds of features has improved.

However, although the head-mounted image display device disclosed in the Japanese Patent Unexamined Publication No. 10(1998)-293544 has its operability improved, there is room for improvement in the structures of the joint members and supporting frames, which are the components of the display device, in terms of their strength and cost. Moreover, there is room for improvement in attaching condition of earphones from the viewpoint of ease of use.

The present invention attempts to overcome the foregoing drawbacks. An object of the present invention is to provide a head-mounted image display device that has components whose structure is simple, whose strength is sufficient, whose capability is satisfactory, and whose cost can be lowered.

DISCLOSURE OF INVENTION

According to one aspect of the present invention, there is provided a head-mounted image display device having an image producing unit. The image producing unit includes an image display means and a projecting optical system that projects an image, which is produced by the image display means, on the observer's eyes. The head-mounted image display device further includes a casing, a pair of frame supporting members, and a pair of frame members. The casing accommodates the image producing unit. The pair of frame supporting members is fixed to the casing. The pair of frame members is worn on the head and supported by the frame supporting members so that the frame members can freely pivot on the frame supporting members. When the casing is worn on the head using the frame members, an image produced by the image producing unit is projected on the observer's eyes. The respective pair to the frame supporting members has the same shape.

According to another aspect of the present invention, there is provided a head-mounted image display device having an image producing unit. The image producing unit includes an image display means and a projecting optical system that projects an image, which is produced by the image display means, on the observer's eyes. The head-mounted image display device includes a casing, a pair of frame supporting members, and a pair of frame members. The casing accommodates the image producing unit. The pair of frame supporting members is fixed to the casing. The pair of frame members is worn on the head and supported by the frame supporting members so that the frame members can freely pivot on the frame supporting members. When the casing is worn on the head using the frame members, an image produced by the image producing unit is projected on the observer's eyes. The each frame member has ribs formed on the surface thereof which faces outside with the head-mounted image display device worn on the head. The ribs are extended over an effective range in the longitudinal direction of each frame member. The ribs on each frame member are a plurality of ribs formed in the width direction. A groove defined with the inner surfaces of the ribs on each frame member serves as a passage groove through which an earphone cord is passed.

According to still another aspect of the present invention, there is provided a head-mounted image display device having an image producing unit. The image producing unit includes an image display means and a projecting optical system that projects an image, which is produced by the image display means, on the observer's eyes. The head-mounted image display device includes a casing body, a pair of frame supporting members, and a pair of frame members. The casing accommodates the image producing unit. The pair of frame supporting members is fixed to the casing body. The pair of frame members is worn on the head and supported by the pair of frame supporting members so that the frame members can pivot on the frame supporting members. When the casing body is worn on the head using the frame members, an image produced by the image producing unit can be projected on the observer's eyes. The each frame member has facing pins formed on the inner surfaces of flanges constituting the proximal portion of each frame member that acts as a fulcrum. The each frame supporting member has pin supporting hole, into which the pin is fitted, bored therein.

BEST MODE FOR CARRYING OUT THE INVENTION

An embodiment of the present invention will be described in conjunction with the drawings below.

Figure 1:
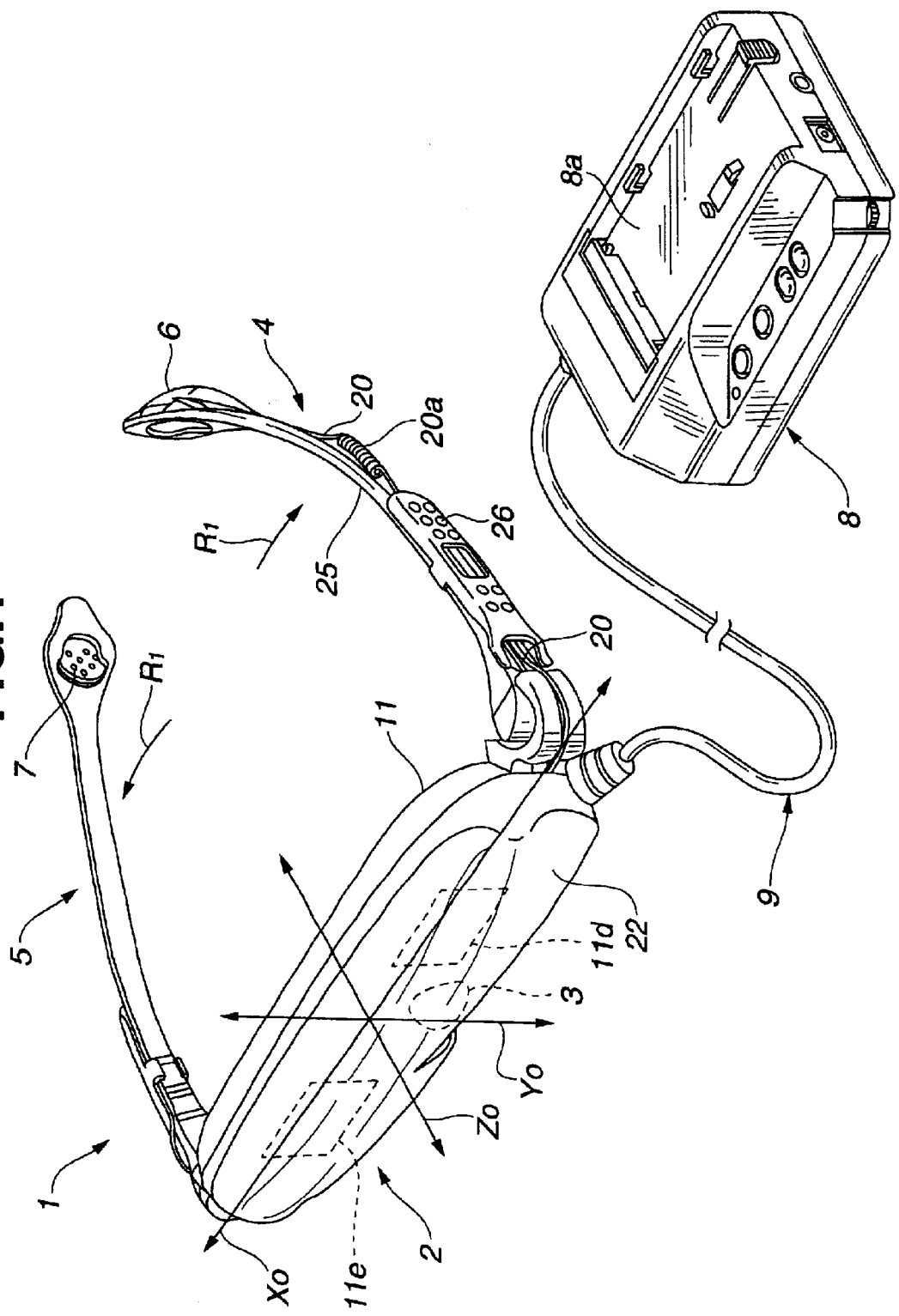
FIG. 1 is a perspective view showing the appearance of a head-mounted image display device HMD in accordance with an embodiment of the present invention.
Figure 2:
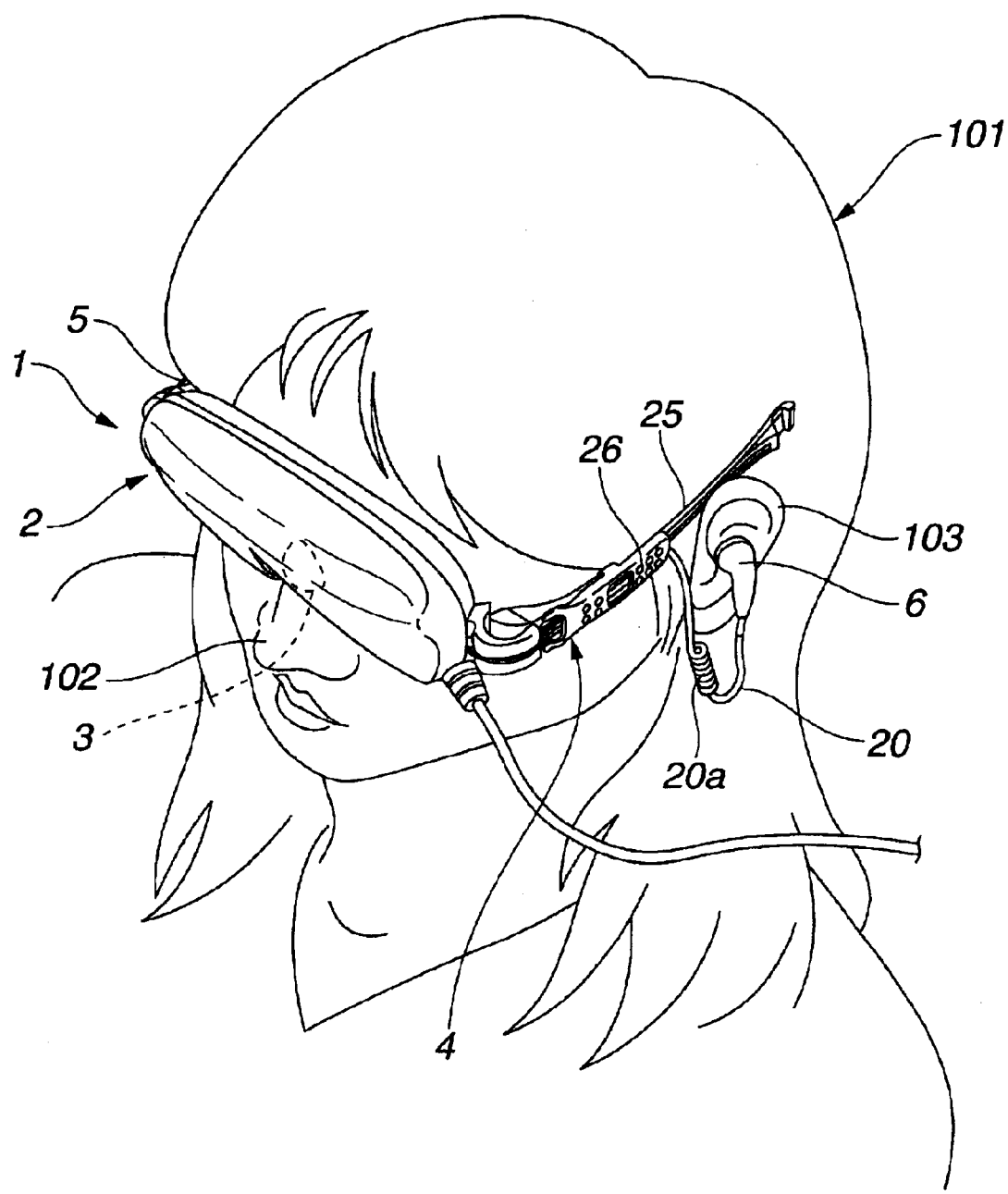
FIG. 2 is a perspective view showing the head-mounted image display device HMD in accordance with the embodiment mounted on the head.
Figure 3:
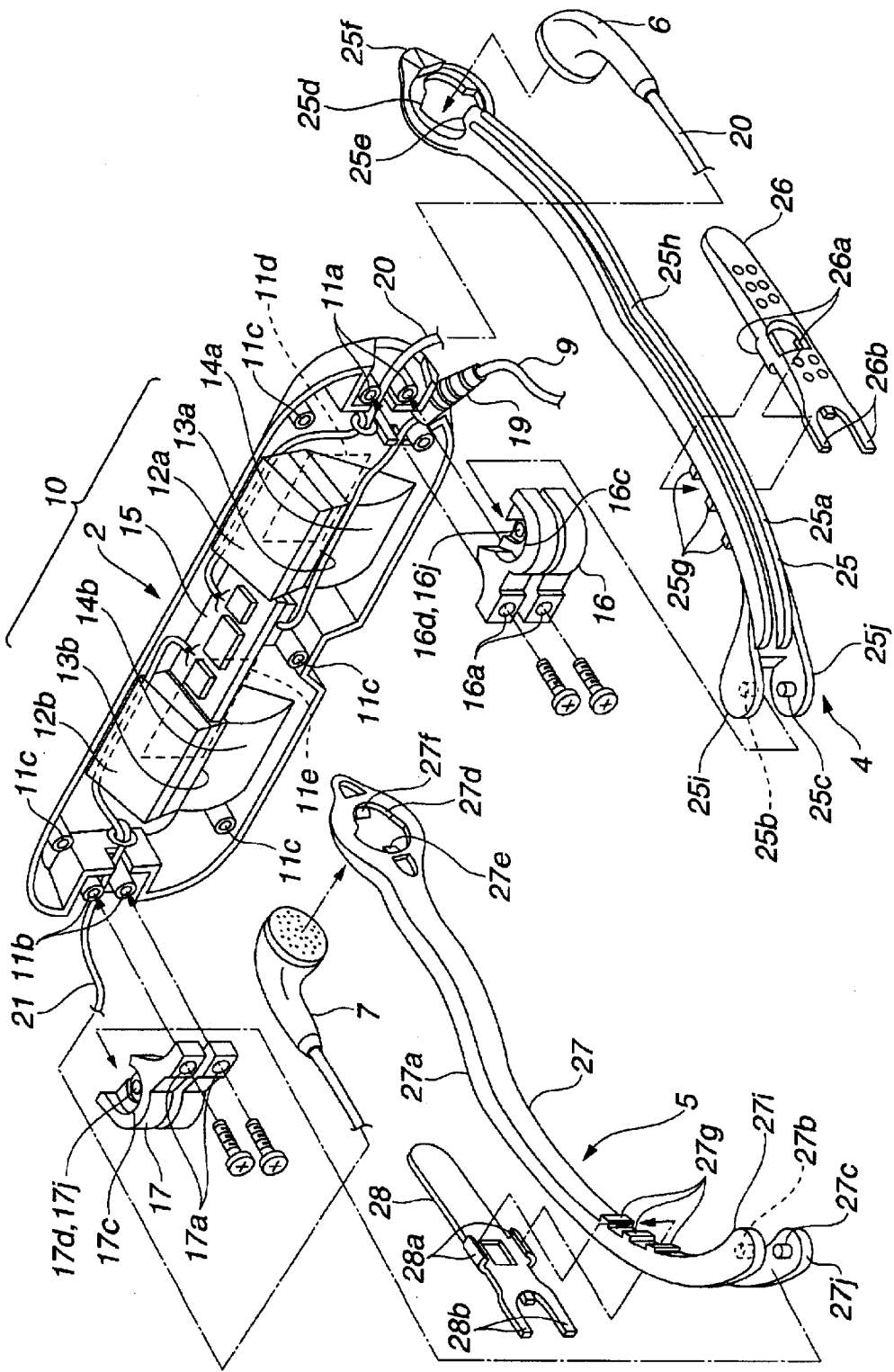
FIG. 3 is an exploded perspective view showing the major components of the head-mounted image display device HMD in accordance with the embodiment.

FIG. 1 is a perspective view showing the appearance of a head-mounted image display device HMD in accordance with an embodiment of the present invention. FIG. 2 is a perspective view showing the head-mounted image display device (HMD) worn on the head. FIG. 3 is an exploded perspective view showing the major components of the head-mounted image display device HMD.

An HMD 1 in accordance with the embodiment of the present invention consists mainly of an image producing unit 2, right and left frames 4 and 5, and a controller 8. The image producing unit 2 has LCDs, which serves as an image display means, enclosed in covers 11 and 22. The right and left frame units 4 and 5 are borne by the cover 11 so that they can pivot, and used to wear the HMD on the head. The controller 8 is connected to the image producing unit over a cable 9 over which a control signal and an image signal are transmitted.

Hereinafter, a description will proceed on the assumption that a leftward direction is the left side relative to an observer who sees the front and rear covers 22 and .11 of the image producing unit 2, and that a rightward direction is the right side relative to the observer. Moreover, a line linking fulcrums on which right and left frames 25 and 26 that will be described later pivot, that is, a line linking the centers of frame supports 16 and 17 that will be described later shall be axis X0. An axis that extends vertically while being orthogonal to the axis X0 shall be axis Y0. An axis that extends back and forth while being orthogonal to the axis X0 shall be axis Z0. Moreover, a direction parallel to the axis X0 shall be a direction X. A direction parallel to the axis Y0 shall be a direction Y. A direction parallel to the axis Z0 shall be a direction Z. When an upper point in the direction Y tilts forward and a lower point therein tilts backward, an inclination shall be +θ. When the upper point in the direction Y tilts backward and the lower point therein tilts forward, the inclination shall be −θ.

When the HMD 1 is used to view an image, the HMD 1 is worn on the observer's head 101 with a nose rest 3 mounted on the nose 102 and with right and left frame units 5 and 4 hung on the ears 103. The nose rest 3 is formed as part of the cover of the image producing unit 2. In this state, right and left image producing windows 11d and 11e of the image producing unit 2 are located in front of the observer's eyes. The observer mounts an image and sound recording memory card on a card mount 8a of the controller 8. A video signal read from the memory card is transferred from the controller 8. Consequently, an image is displayed on the LCDs. The light carrying the display image is converged on the observer's eyes through the image producing windows 11d and 11e. Consequently, the image is viewed. Moreover, sounds are heard with right and left earphones 7 and 6 detached from the right and left frame units 5 and 4 and inserted into the ears 103.

The structures of the components of the HMD 1 will be described below.

The image producing unit 2 consists mainly of the front and rear covers 22 and 11, an image producing block 10, right and left frame supports 17 and 16, right and left earphone cords 21 and 20, and a signal cable 9. The front and rear covers 22 and 11 are casing members. The image producing block 10 is borne by the rear cover 11. The right and left frame supports 17 and 16 that are paired frame supporting members are also borne by the rear cover 11. The right and left earphone cords 21 and 20 are routed to the image producing block 10. The signal cable 9 is routed to the image producing block 10 through a connector and held in a bushing 19.

The earphones 6 and 7 are of a headphone-embedded type. The earphone cord 20 is passed through a passage groove 25h formed in the left frame 25 that will be described later. A portion of the earphone code 20 coming out of an adjuster 26, which will be described later, includes a stretchable and contractile coil spring portion (curled portion) 20a (see FIG. 1). Likewise, the right earphone cord 21 is passed through a passage groove 27h formed in the right frame 27. A portion of the right earphone cord 21 coming out of an adjuster 28, which will be described later, includes a similar stretchable and contractile coil spring portion (curled portion).

The right or left frame unit 5 or 4 consists mainly of a right or left frame 27 or 25 and the adjuster 28 or 26. The right and left frames 27 and 25 are a pair of frame members supported by the right and left frame supports 17 and 16 so that the frame members can pivot freely. The adjusters 28 and 26 are a pair of adjusters attached to the frames so that the adjusters can slide freely. The adjusters 28 and 26 are magnitude-of-frame pivot changing devices.

The image producing block 10 is fixed to and borne by the rear cover 11. The image producing block 10 includes right and left LED surface light sources 12b and 12a, right and left LCDs 13b and 13a, right and left prisms 14b and 14a, and a circuit board 15. The right and left LCDs 13b and 13a serve as an image display means and are located below the surface light sources. The right and left prisms 14b and 14a are located below the LCDS. An IC serving as a LCD drive circuit for driving the LCDs 13b and 13a and an IC serving as an audio circuit are mounted on the circuit board 15.

In the image producing block 10, light rays carrying images transmitted by the LCDs 13b and 13a are reflected from the prisms 14b and 14a, and projected on the observer's eyes through the image producing windows 11e and 11d.

The earphone cords 21 and 20 are routed within the rear cover 11 as mentioned below. Specifically, the earphone cord 21 or 20 is passed through a gap between bosses 11b or 11a to which the frame support 17 or 16 is screwed and which are formed on the wall of the rear cover 11. After the earphone cord 21 or 20 is knotted, the earphone cord 21 or 20 is passed behind the LED surface light source 12b or 12a and then soldered directly to the circuit board 15.

The right and left frame supports 17 and 16 are formed using the same member, and attached to the right and left ends of the rear cover 11. When attached, the right and left frame supports 17 and 16 are faced.

Figure 4:
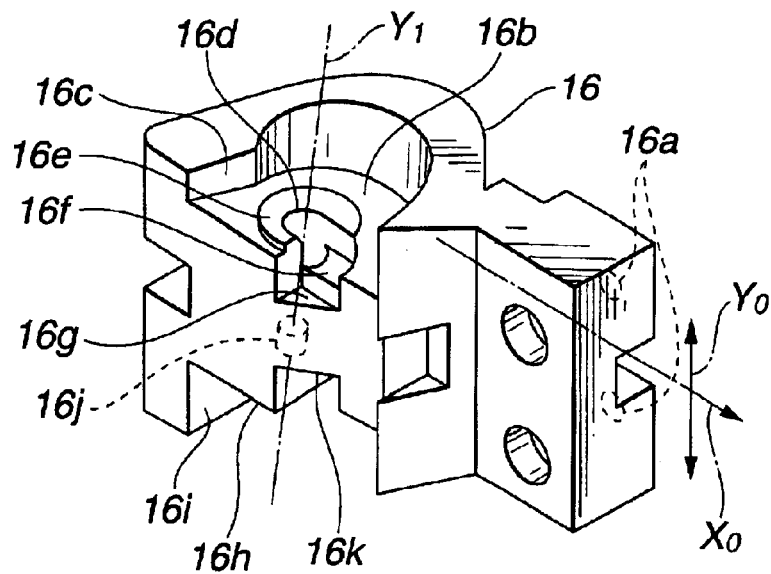
FIG. 4 is a perspective view showing a frame support included in the head-mounted image display device HMD in accordance with the embodiment.
Figure 5:
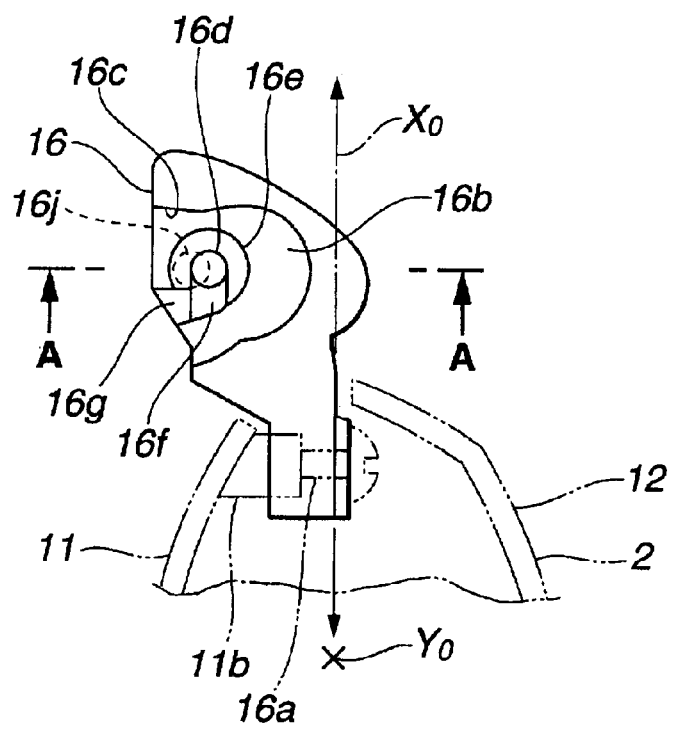
FIG. 5 is a plan view showing the frame support included in the head-mounted image display device HMD in accordance with the embodiment.
Figure 6:
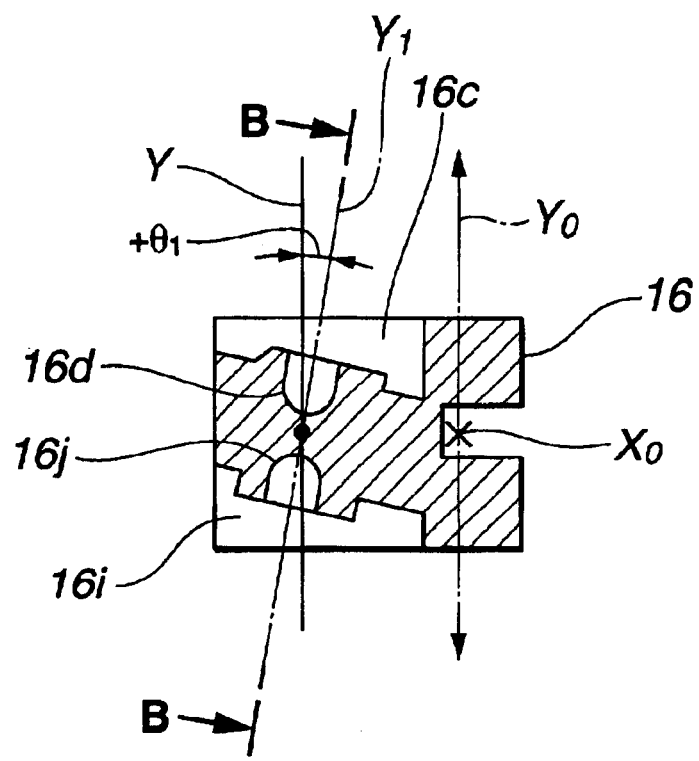
FIG. 6 is an A—A sectional view of the frame support shown in FIG. 5.
Figure 7:
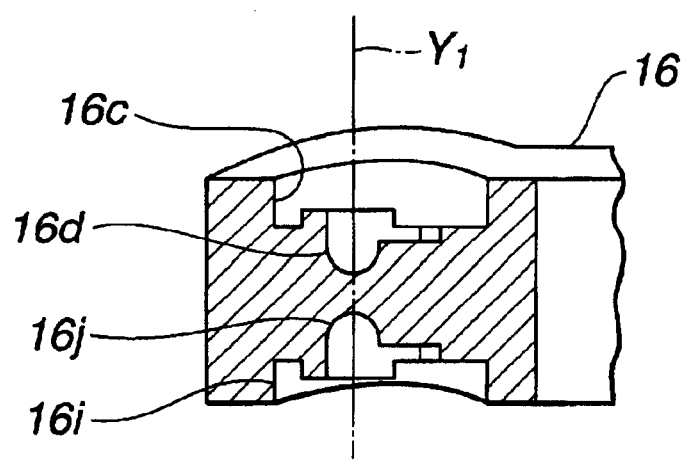
FIG. 7 is a B—B sectional view of the frame support shown in FIG. 6.

FIG. 4 is a perspective view of the frame support 16. FIG. 5 is a plan view of the frame support 16. FIG. 6 is an A—A sectional view of the frame support 16 shown in FIG. 5, and FIG. 7 is a B—B sectional view thereof.

The frame support 16 has attachment holes 16a, concave parts 16b and 16h, inner walls 16c and 16i, and frame supporting holes 16d and 16j. The attachment holes 16a are joined to the bosses 11a formed on the rear cover 11 using screws. The concave parts 16b and 16h are formed in the upper and lower surfaces respectively. The inner walls 16c and 16i are the walls of the concave parts and contacts frame flanges. The frame supporting holes 16d and 16j are bored in the concave parts. Pins formed on the frame 25 and 27, which will be described later, are fitted into the frame supporting holes 16. An axis Y1 linking the frame supporting holes 16d and 16j is inclined by an angle +θ1 (approximately +8°) relative to the direction Y. The angle θ1 corresponds to an inclination by which the plane on which the left and right frame supported by the frame support 16 pivots is inclined.

Moreover, a peripheral convex part 16e for preventing the left frame from coming off is formed on the perimeter of the frame supporting hole 16d in the concave part 16b of the upper surface. Furthermore, a concave part 16f is formed as an L-shaped groove for assisting in insertion or removal of one of the pins formed on the left frame. A step 16g is formed one step below the concave part 16f.

On the other hand, the same peripheral convex part is formed on the perimeter of the frame supporting hole 16j bored in the concave part 16h in the lower (back) surface of the frame support 16. Furthermore, a concave part serving as an L-shaped groove for assisting in insertion or removal of the other pin formed on the left frame, and a step 16k are also formed.

On the other hand, the right frame support 17 is, as mentioned above, realized with the same shaped member as the left frame support 16. The right frame support 17 is fixed to the right bosses 11b formed on the rear cover 11 in a vertically reversed state relative to the left frame support 16. An axis Y2 linking frame supporting holes 17d and 17j bored in the right frame support 17 is inclined by a tilt angle of −θ1 (approximately −8°).

Figure 8:
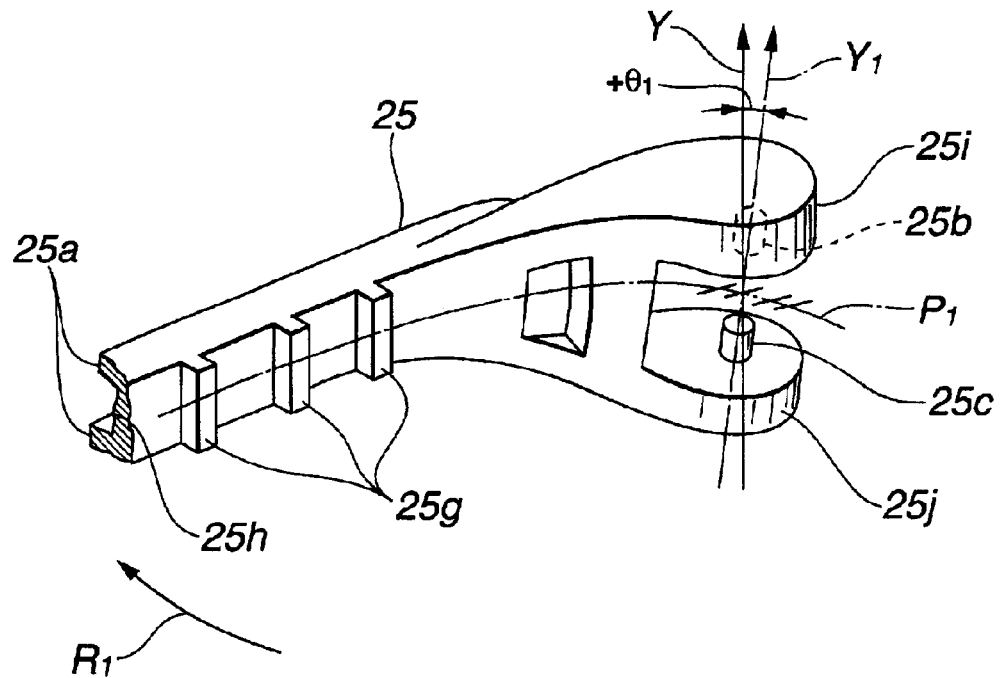
FIG. 8 is a partial perspective view showing the proximal portion of a left frame included in the head-mounted image display device HMD in accordance with the embodiment which acts as a fulcrum.
Figure 9:
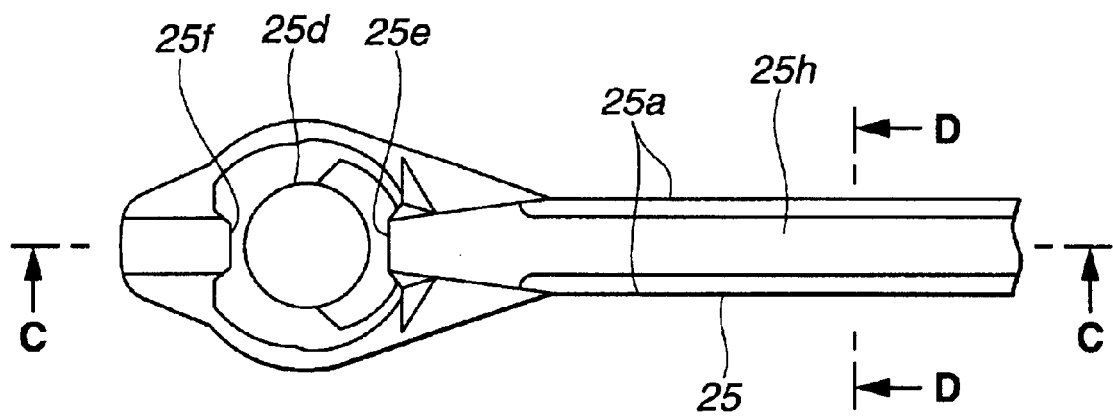
FIG. 9 is a plan view showing the distal portion of the left frame included in the head-mounted image display device HMD in accordance with the embodiment (which has an earphone holder)
Figure 10:
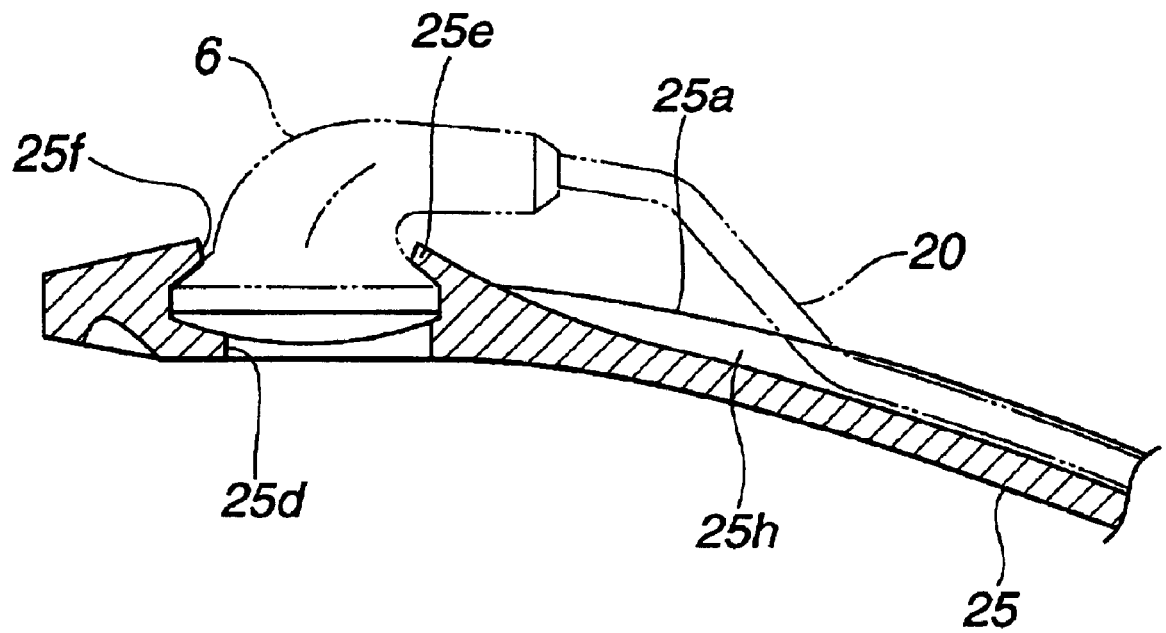
FIG. 10 is a C—C sectional view of the left frame shown in FIG. 9.
Figure 11:
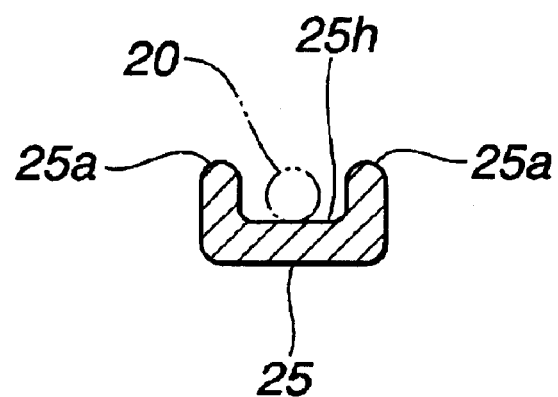
FIG. 11 is a D—D sectional view of the left frame shown in FIG. 9.
Figure 14:
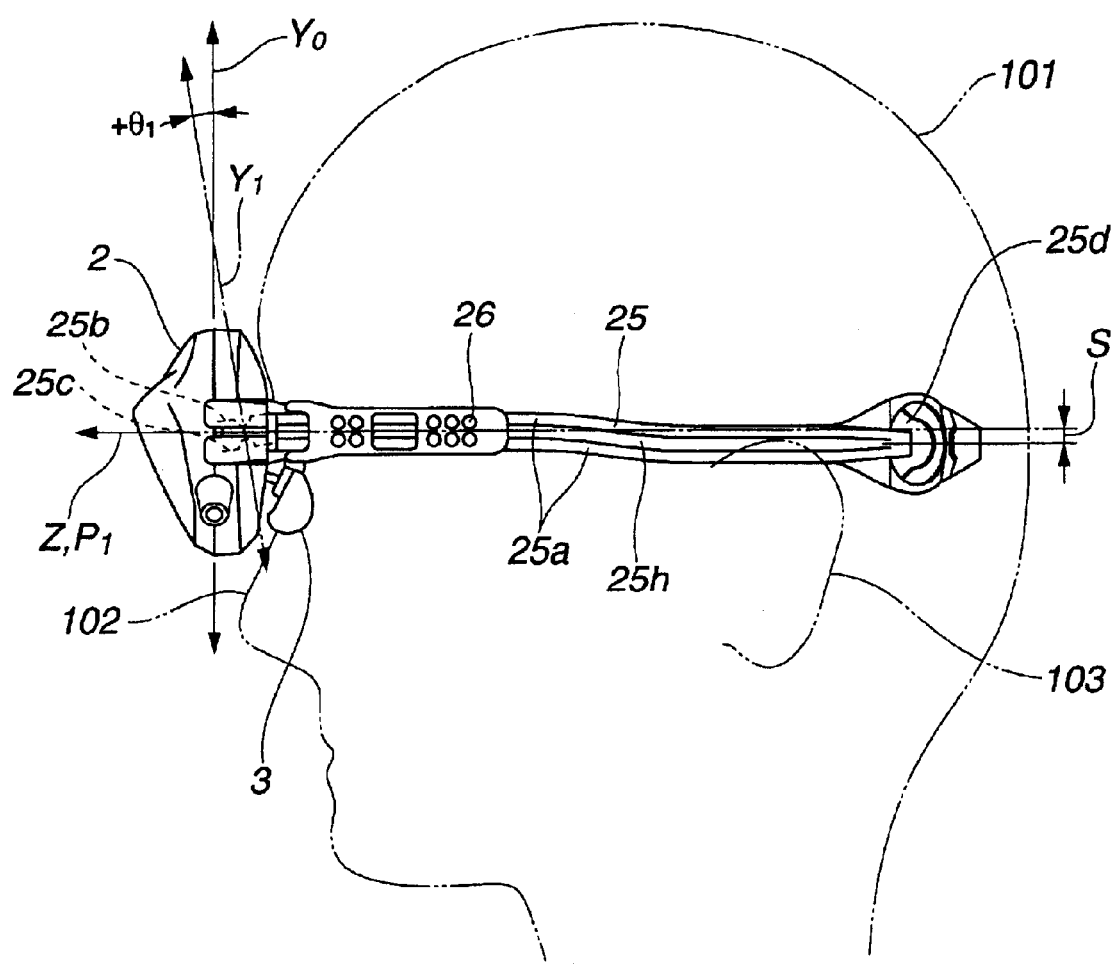
FIG. 14 is a side view showing the head-mounted image display device HMD in accordance with the embodiment which is worn on the head and seen from left.

The appearance of the left frame 25 is shown in FIG. 3 that is the perspective view and in FIG. 14 that is a side view of the left frame 25 with the HMD 1 worn on the head and seen from left. Part of the left frame 25 is shown in detail in FIG. 8, FIG. 9, FIG. 10, and FIG. 11. FIG. 8 is a perspective view showing the proximal portion of the left frame that acts as a fulcrum. FIG. 9 is a plan view showing the distal portion of the left frame. FIG. 10 is a C—C sectional view of the distal portion shown in FIG. 9. FIG. 11 is a D—D sectional view of the distal portion shown in FIG. 9.

Figure 15:
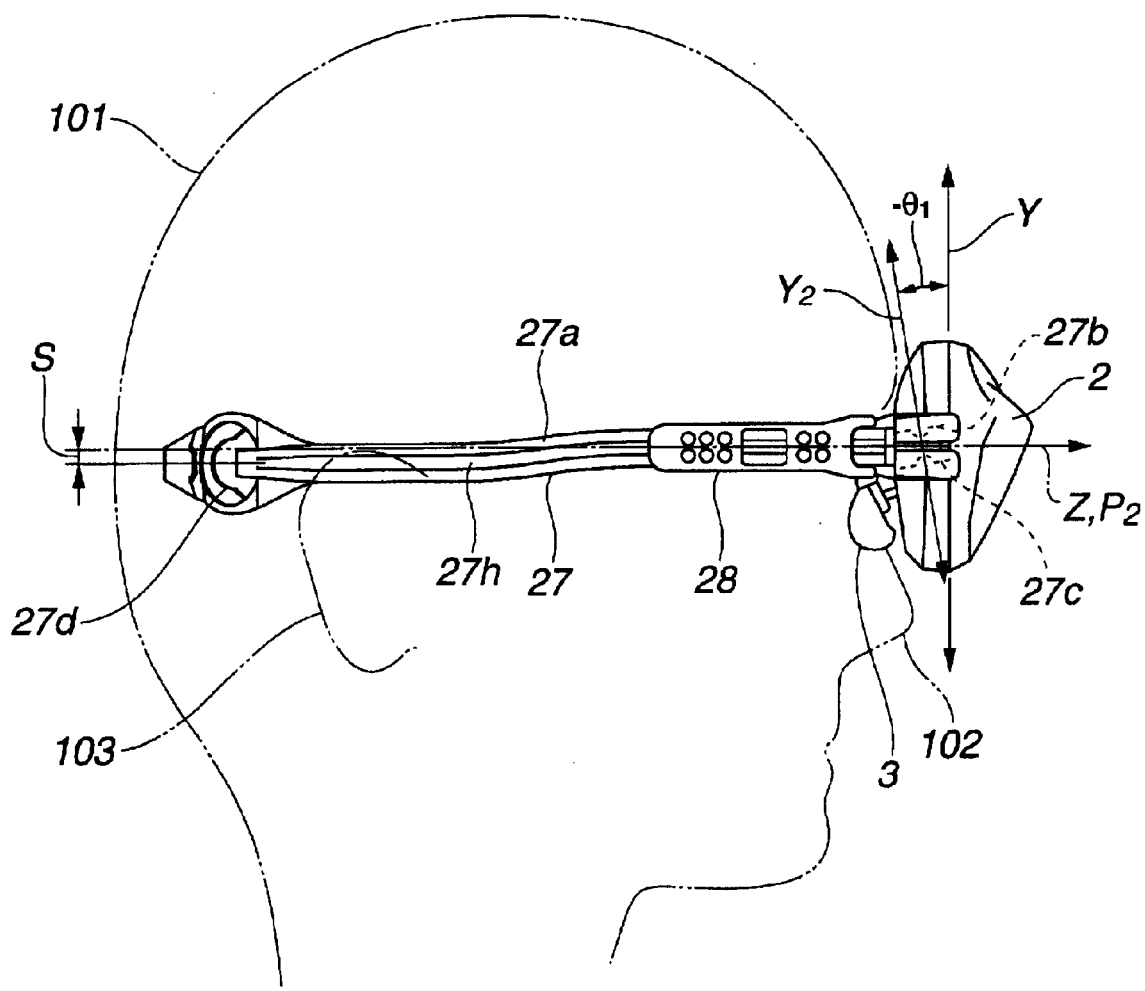
FIG. 15 is a side view showing the head-mounted image display device HMD in accordance with the embodiment which is worn on the head and seen from right.

The shape of the right frame 27 that will be described later is symmetric to the shape of the left frame 25. The appearance of the right frame 27 is shown in FIG. 15 that is a side view of the right frame 23 with the HMD 1 worn on the head and seen from right.

The left frame 25 has, as shown in FIG. 8, two ribs 25a of upper and lower ribs formed on the outer surface thereof, which faces outside with the HMD worn on the head, over substantially the whole range in the longitudinal direction. The upper and lower ribs 25a are formed in order to reinforce the frame. A groove 25h defined by the ribs 25a has the middle portion thereof covered with the adjuster 26 that will be described later. The groove 25h is, as shown in FIG. 11, used as a passage groove through which the earphone cord 20 is passed.

On the other hand, the right frame 27 has two ribs of upper and lower ribs 27a formed on the outer surface thereof, which faces outside with the HMD worn on the head, along substantially the whole range in the longitudinal direction. The upper and lower ribs 27a are formed in order to reinforce the right frame. A groove 27h sandwiched by the ribs 27a has the middle portion thereof covered with the adjuster 28 that will be described later. The groove 27h is used as a passage groove through which the earphone cord 21 is passed.

In the left frame 25, pins 25b and 25c are formed on the inner surfaces of flanges 25i and 25j that constitute the proximal portion of the left frame which act as a fulcrum. The pins 25b and 25c are facing and fitted into the frame supporting holes 16d and 16j. An axis Y1 linking the pins 25b and 25c is inclined by an angle of +θ1 relative to the direction Y. The direction Y is orthogonal to a major axis plane (a plane containing a center line, which passes the center of the width of the left frame) defined in the proximal portion of the left frame that acts as a fulcrum.

Moreover, the distal portion of the left frame 25 that has an opening 25d and acts as an earphone holder is shifted down by a dimension S with respect to the major axis plane P1. The major axis plane P1 is defined in the proximal portion thereof that has the pins 25b and 25c and acts as a fulcrum.

On the other hand, the right frame 27 has, as shown in FIG. 3, pins 27b and 27c formed on the inner surfaces of flanges 27i and 27j that constitute the proximal portion of the right frame 27 which acts as a fulcrum. The pins 27b and 27c are facing and fitted into the frame supporting holes 17d and 17j of the frame support 17 so that the right frame 27 can pivot freely. An axis Y2 linking the pins 27b and 27c is inclined by an angle −θ relative to the direction Y. The direction Y is orthogonal to a major axis plane P2 ((a plane containing a center line that passes the center of the width of the right frame) (see FIG. 15)) defined in the proximal portion of the right frame 27 that acts as a fulcrum.

Furthermore, the distal portion of the right frame 27 that has an opening 27d and acts as an earphone holder, as shown in FIG. 15, is shifted down by a dimension S with respect to the major axis plane P2. The major axis plane P2 is defined in the proximal portion thereof that acts as a fulcrum and that has the pins 26b and 26c. When the HMD 1 is worn on the head as shown in FIG. 14 and FIG. 15, the direction Y and the direction Z shall be substantially consistent with a vertical direction and a horizontal direction respectively.

The left frame 25 has, as shown in FIG. 3 and FIG. 8, three projections 25g formed near the proximal portion thereof that acts as a fulcrum. The adjuster 26 is mounted on the portion of the left frame having the three projections so that the adjuster 26 can slide. Claws 26a of the adjuster 26 are fitted in gaps among the projections 25g, whereby the adjuster 26 is positioned.

On the other hand, the right frame 27 has, as shown in FIG. 3, three projections 27g formed near the proximal portion thereof that acts as a fulcrum. The adjuster 28 is mounted on the portion of the right frame 27 having the projections 27g so that the adjuster 28 can slide. Claws 28a of the adjuster 28 are fitted in gaps among the projections 27g, whereby the adjuster 28 is positioned.

The adjuster 26 is symmetric in the width direction thereof in which the claws 26a as well as distal projections 26b are formed. The distal projections 26b are used to change a magnitude of pivot/open and shaped like prongs of a fork. The adjuster 28 has the same shape as the adjuster 26. Similarly to the adjuster 26, the adjuster 28 has distal projections 28b, which are used to change a magnitude of pivot/open and shaped like prongs of a fork, as well as the claws 28a.

Furthermore, the distal portion of the left frame 25 has, as shown in FIG. 9 and FIG. 10, the opening 25d and two claws 25e and 25f that are facing, and thus acts as an earphone holder. The earphone holder is symmetric in the width direction thereof.

When the HMD 1 is carried by a user, the earphone 6 is held in the earphone holder. In this case, the earphone 6 is first engaged with either of the claws 25e and 25f facing each other, and then fitted in the opening 25d so that the earphone will be clamped by the claws 25e and 25f. Referring to FIG. 9, the earphone 6 may be slid below the claws 25e and 25f from above or below in the width direction and then held in the stowage.

On the other hand, the proximal portion of the right frame 27 has, as shown in FIG. 3, the opening 27d and claws 27e and 27f that are facing, and thus acts as a laterally-symmetric earphone holder. The procedure of putting the earphone 7 in the earphone holder is the same as the procedure of putting the earphone 6 in the earphone holder formed in the left frame 25.

Figure 12A:
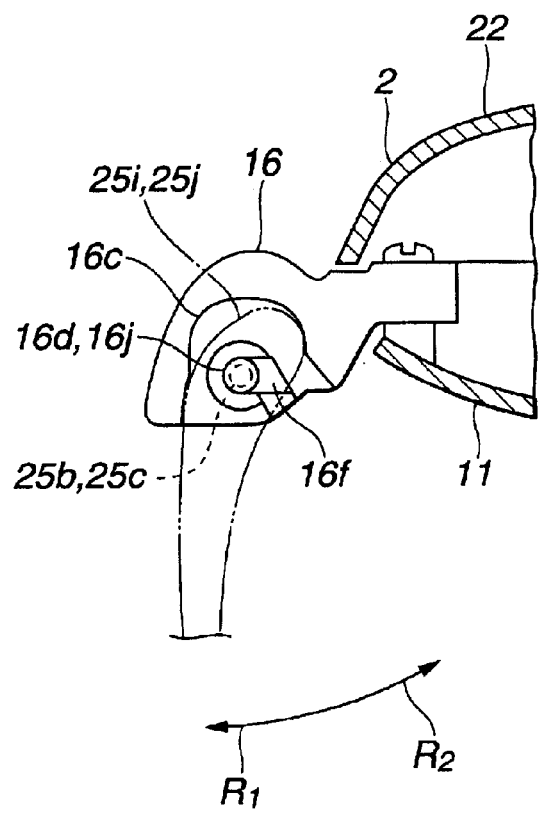
FIG. 12A is a plan view showing the left frame of the head-mounted image display device HMD in accordance with the embodiment, wherein the left frame is attached to a left frame support so that the left frame can pivot, and turned in a direction R1 (a direction of opening)
Figure 12B:
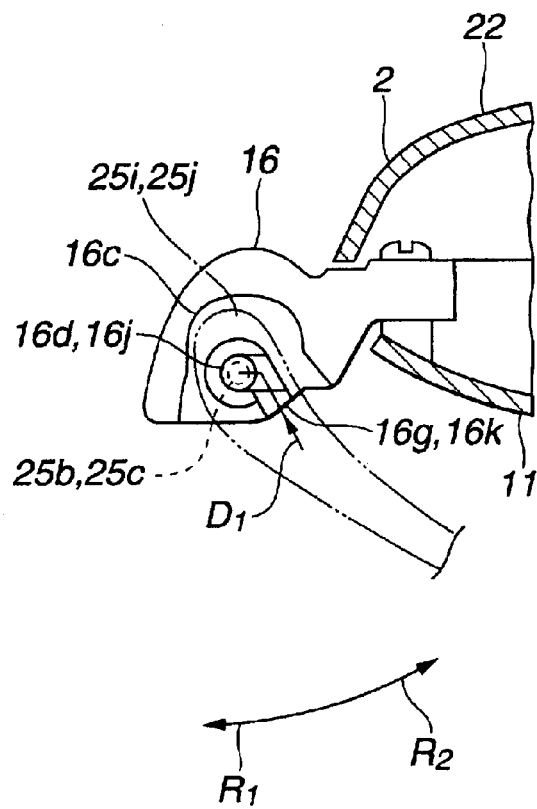
FIG. 12B is a plan view showing the left frame of the head-mounted image display device HMD in accordance with the embodiment, wherein the left frame is attached to the left frame support so that the left frame can pivot, turned in a direction R2 (a direction of closing), and thus folded.

Next, the procedure of attaching or detaching the left frame 25 to or from the frame support 16 will be described below. FIG. 12A and FIG. 12B are plan views showing the left frame 25 attached to the left frame support 16. FIG. 12A shows a use state (for viewing) in which the left frame 25 is turned in a direction R1 (a direction of opening). FIG. 12B shows a folded state (a portable or storable state) in which the left frame 25 is turned in a direction R2 (a direction of closing).

In the state shown in FIG. 12A or FIG. 12B, the upper and lower pins 25b and 25c of the left frame 25 are fitted into the frame supporting holes 16d and 16j. In the state shown in FIG. 12A, the flanges 25i and 25j of the left frame 25 contacts the inner walls 16c of the frame support 16. The left frame 25 does not therefore move inwards (towards the center of the rear cover 11). Consequently, the upper and lower pins 25b and 25c will not come off from the frame supporting holes 16d and 16j.

In the state shown in FIG. 12B, there is a gap between the flanges 25i and 25j of the left frame 25 and the inner walls 16c of the frame support 16. Therefore, the left fame 25 can move inwards (towards the center of the rear cover 11). Consequently, while the flanges 25i and 25j of the left frame 25 are deformed elastically in the thickness direction thereof, the upper and lower pins 25b and 25c can be removed from the frame supporting holes 16d and 16j in order to disassemble the left frame and image producing unit. Otherwise, the upper and lower pins 25b and 25c can be inserted into the frame supporting holes 16d and 16j in order to assemble the left frame and image producing unit.

During the assembling, when the pins 25b and 25c of the left frame 25 are fitted into the frame supporting holes 16d and 16j, the pins 25b and 25c are first temporarily engaged with the narrow steps 16g and 16k of the frame support 16 from a direction D1. Thereafter, the space between the pins 25b and 25c is widened, and passed through the concave parts 16f of the frame support that are the L-shaped grooves assisting in insertion or removal of the pins. Finally, the pins 25b and 25c are fitted into the frame supporting holes 16d and 16j.

As mentioned above, the frame supporting holes 16d and 16j are inclined by an angle $+\theta 1$. Therefore, when the left frame 25 is attached to the frame support 16, the axis Y1 linking the pins 25b and 25c of the left frame 25 is also inclined by the angle $+\theta 1$ as shown in FIG. 14. Consequently, when the HMD 1 is worn on the head, the major axis plane P1 defined in the proximal portion of the left frame 25 that acts as a fulcrum is kept horizontal and aligned with the direction Z.

On the other hand, the procedure of attaching or detaching the right frame 27 to or from the frame support 17 is the same as the procedure of attaching or detaching the left frame 25. However, as mentioned above, the frame supporting holes 17d and 17j are inclined by an angle $-\theta 1$. Therefore, when the frame 27 is attached to the frame support 17, the axis Y2 linking the pins 25b and 25c of the frame 27 is inclined by the angle $-\theta 1$ as shown in FIG. 15. Consequently, when the HMD 1 is worn on the head, the major axis plane P2 defined in the proximal portion of the right frame that acts as a fulcrum is kept horizontal and aligned with the direction Z.

The distal portion of the right or left frame 27 or 25 that acts as the earphone holder is shifted down by the dimension S with respect to the proximal portion thereof that acts as a fulcrum. Therefore, when the HMD 1 is worn on the observer's head 101, the image producing windows 11d formed in the cover of the HMD 1 are disposed opposite the observer's eyes with the portions near the distal portions of the right and left frames placed on the ears 103. An image can therefore be viewed optimally.

With the HMD 1 worn on the head, the right and left frames 27 and 25 are pushed outwards by the head and deformed elastically. Compressing force with which the frames compress the head can be adjusted by changing a magnitude (angle) of pivot, by which the right or left frame pivots in the direction of spreading (direction RI) using the adjuster 28 or 26.

The procedure of adjusting the magnitude of pivot (spreading) by which the right or left frame 27 or 25 pivots to spread is the same between the right and left frames 27 and 25. The procedure of adjusting the magnitude of pivot by which the left frame 25 pivots will therefore be described below.

Figure 13A:
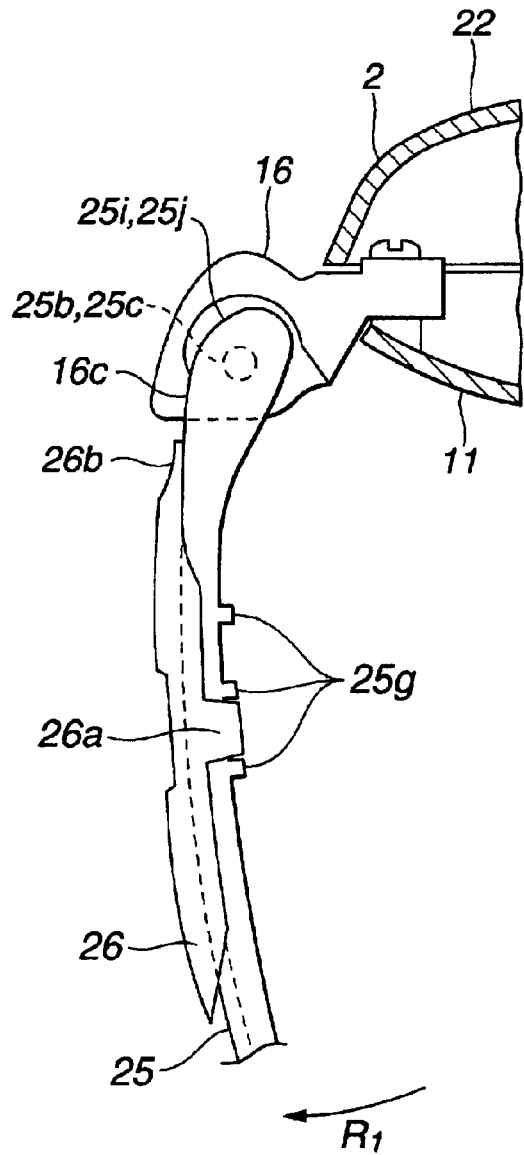
FIG. 13A is a plan view showing the left frame of the head-mounted image display device HMD in accordance with the embodiment, wherein a pivot/open angle by which the left frame pivots to open is adjusted to be larger.
Figure 13B:
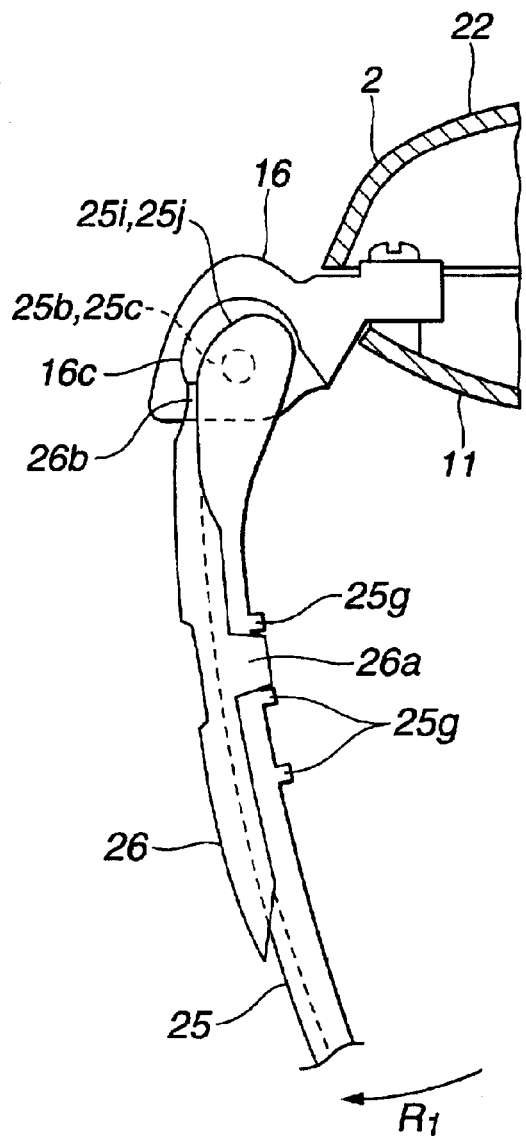
FIG. 13B is a plan view showing the left frame of the head-mounted image display device HMD in accordance with the embodiment, wherein the pivot/open angle by which the left frame pivots to open is adjusted to be smaller.

FIG. 13A and FIG. 13B are plan views showing adjustment of an angle by which the left frame can pivot. Referring to FIG. 13A, the adjuster 26 has the claws 26a fitted into a gap between an outer pair of projections 25g formed on the left frame 25. The flanges 25i and 25j of the left frame 25 can contact directly the inner walls 16c of the frame support 16. The left frame 25 can be widely spread in the direction R1.

In contrast, referring to FIG. 13B, the adjuster 26 is slid towards the proximal portion of the frame that acts as a fulcrum. The claws 26a are fitted into a gap between an inner pair of projections 25g of the left frame 25. In this state, each of the distal projections 26b of the adjuster 26 intervenes between the inner wall 16c of the frame support 16 and the flange 25i or 25j of the left frame 25. The left frame 25 can be spread in the direction R1 by a smaller angle.

The aforesaid adjustment of a spreading angle is performed on the right frame 27 too. Thus, the manner in which the right and left frames 27 and 25 are worn on the head 101, that is, force by which the right and left frames 27 and 25 compress the head 101 can be adjusted.

According to the present embodiment, the number of projections 27g or 25g of the right or left frame 27 or 25 over which the adjuster 28 or 26 is mounted is three. The adjusters 28 and 26 can therefore be slid to either of two positions. The present invention is not limited to this mode. Alternatively, a click that locks the adjuster at two or more specified positions may be formed in the frames or adjusters. In this case, a spreading angle can be adjusted finely. Moreover, the adjusters 28 and 26 may not be locked at any specified positions but may be slid to any position. In this case, the spreading angle can be adjusted to any desired value but need not be set to any of specified values. However, in this case, the distal projections 28b and 26b of the adjusters 28 and 26 must be tapered or the inner walls of the frame supports 17 and 16 must be continuously inclined.

When the HMD 1 of the present embodiment having the aforesaid components is used to view an image, first, the HMD 1 is, as shown in FIG. 2, worn on the head 101 with the right and left arms 27 and 25 turned in the direction of spreading. At this time, the nose rest 3 is placed on the nose 102. In this state, the image producing windows 11e and 11d of the image producing unit 2 are located in front of the observer's eyes. The earphones 7 and 6 are taken out of the earphone holders and inserted into the ears 103.

With the HMD 1 worn on the head, light representing an image produced according to a video signal sent from the controller 8 is projected on the observer's eyes by way of the prisms 14b and 14a and image producing windows 11e and 11d. Consequently, an image is viewed. Moreover, sounds generated according to an audio signal are heard through the earphones 7 and 6.

Moreover, when the HMD 1 is carried or stowed, the earphones 7 and 6 are stowed in the earphone holders so that the earphone cords will not sag. The right and left frames 27 and 25 are folded so that the HMD 1 can be carried or stowed readily.

Figure 16:
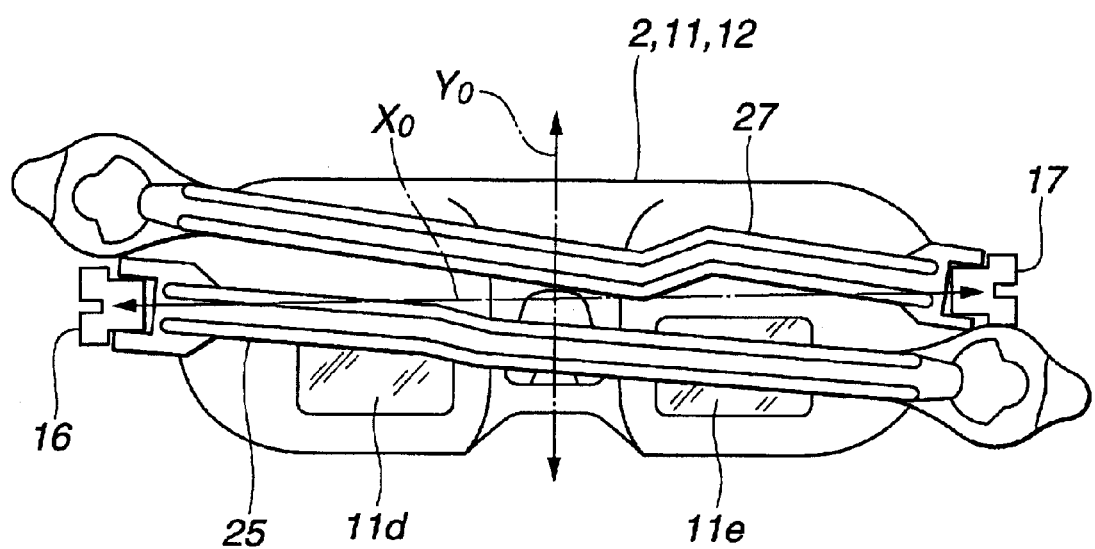
FIG. 16 shows the head-mounted image display device HMD in accordance with the embodiment whose right and left frames are folded in order to carry or store the head-mounted image display device HMD, and which is seen from the side of image producing windows.

FIG. 16 shows the HMD 1 in a portable or storable state, wherein the HMD 1 is seen from behind. The right and left frames 27 and 25 are folded inwards. The axis Y1 linking the pins 25b and 15c of the left frame 25 is inclined back and forth by an angle $+\theta 1$, and the axis linking the pins 27b and 27c of the right frame 27 is inclined back and forth by an angle $-\theta 1$. Therefore, when the frames are folded as shown in FIG. 16, the right and left frames 27 and 25 will not interfere with each other.

The HMD 1 may be worn on a user who has a big nose or a different skull. In this case, if the HMD 1 is used as it is, the nose rest 3 moves obliquely forwards. The distal portions (that are near the earphone holders) of the right and left frames 27 and 25 are therefore located in the middles of the ears. The user wearing the HMD would feel uncomfortable.

According to the present embodiment, the right and left frames 27 and 25 of the HMD 1 are detached temporarily, replaced with each other, and then attached to the frame supports 17 and 16. This results in a custom-made HMD. Using this custom-made HMD, even a user who has a big nose can enjoy an image viewing optimally.

Figure 17:
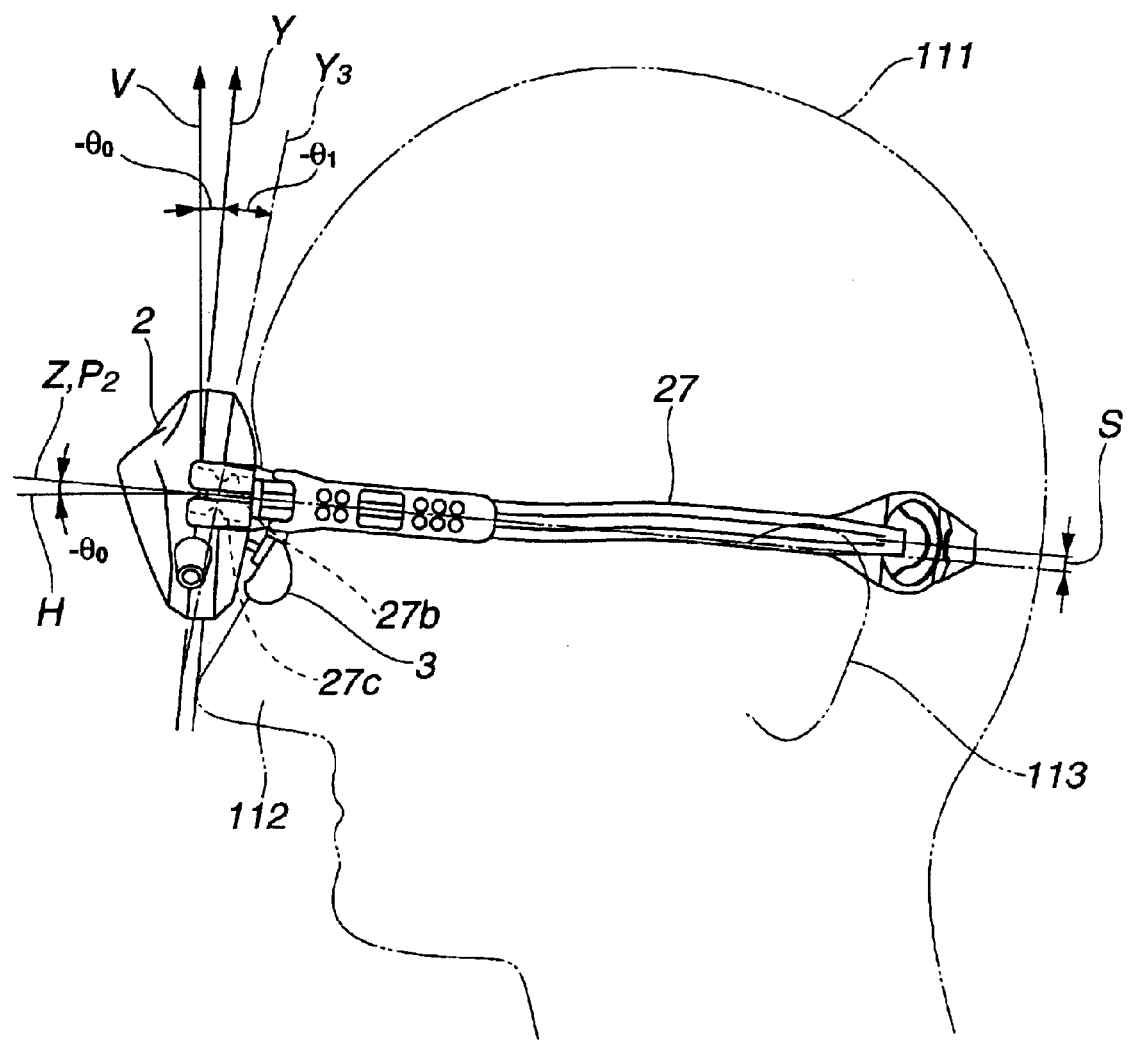
FIG. 17 is a side view showing the head-mounted image display device HMD in accordance with the embodiment whose right and left frames are replaced with each other in order to produce a custom-made head-mounted image display device HMD.

FIG. 17 is a side view showing a custom-made HMD worn on the head 111 of an observer who has a big nose, wherein the HMD is seen from left. In the worn state shown in FIG. 17, compared with the worn state shown in FIG. 14, the nose rest 3 is lifted because of the big nose 112. Therefore, the direction Y and direction Z (consistent with the direction of the major axis plane P2) defined on the custom-made HMD are deflected from the vertical direction V and horizontal direction H respectively by an angle $-\theta 0$. Moreover, since the right and left frames are replaced with each other, the axis Y3 linking the pins 27b and 27c of the right frame 27 attached to the left frame support is inclined by another angle of $-\theta 1$.

The distal portion of the right frame 27 attached to the left frame support 16 is, unlike the one shown in FIG. 14, shifted up by the dimension S. The distal portion will therefore not be located in the middle of the ear but will be placed at the upper normal position on the ear 113. The left frame 25 is attached to the right frame support 17 in the same manner, and therefore placed at the upper normal position on the ear 113. Consequently, as long as the custom-made HMD having the frames replaced with each other is employed, even an observer having a big nose can view an image normally.

The HMD 1 of the present embodiment has advantages described below.

(1) A common member can be used as the frame supports 17 and 16 that support the right and left frames so that the right and left frames can pivot. This results in the reduced cost of parts and the simplified management of parts.

(2) The pin supporting holes for supporting the pins formed on the frames so that the right and left frames can pivot are inclined. Therefore, when the right and left frames 27 and 25 are folded in order to carry the HMD, the right and left frames will not interfere with each other. This is helpful in carrying or storing the HMD.

(3) The right and left frames 27 and 25 have the upper and lower ribs 27a and 25a for reinforcement formed on the outer surfaces thereof that are the other side of surfaces facing the head with the HMD worn on the head. With the HMD worn on the head, compressive stress works on the tips of the ribs. Therefore, a crack derived from tensile stress will not occur. This is advantageous in terms of strength. Furthermore, the ribs 27a or 25a can be formed over substantially the whole length of each frame. The formation of the ribs is therefore markedly effective in reinforcing the frame.

(4) The ribs 27a and 25a on the right and left frames 27 and 25 are formed on the outer surfaces of the frames. The ribs will therefore not come into contact with the head. A user wearing the HMD would therefore feel comfortable.

(5) The groove sandwiched by the upper and lower ribs 27a or 25a of the right or left frame 27 or 25 and having a portion thereof covered with the adjuster 28 or 26 is utilized as the cord passage groove 27h or 25h that guides the earphone cord 21 or 20. Consequently, the earphone cords 21 and 20 will not bother a user who wears or carries the HMD. The user will find the HMD 1 user-friendly.

(6) With the right and left frames 27 and 25 folded, without using any tool, the frames can be attached to or detached from the frame supports through the L-shaped grooves that assist in attachment and detachment and that are formed in the supports. This results in easy assembling and repair.

(7) When the right and left frames 27 and 25 are replaced with each other, the HMD can be provided as a custom-made HMD in which the positions of the frames relative to the position of the nose are changed.

(8) Furthermore, when the custom-made HMD is realized, the right and left frames can be detached and attached without the necessity of any tool. The specifications for the HMD can therefore be modified easily.

(9) A spreading angle by which the right or left frame 27 or 25 is spread can be adjusted readily by merely sliding the adjuster 28 or 26. Thus, the HMD would be found user-friendly.

(10) The adjusters 28 and 26 are realized with the same member. This contributes to a reduction in the cost of parts.

(11) The earphones 7 and 6 can be readily held in the earphone holders in the right and left frames 27 and 25 by clamping each earphone with two claws or sliding each earphone vertically. The HMD can therefore be readily brought into a portable or storable state.

(12) The earphones 7 and 6 may be held in the earphone holders in the frames by claming each earphone with two claws. In this case, even if slightly aggressive force works on the earphone holders, since the earphone holders deform readily, the earphone holders will not be damaged. The claws come into contact with the outer cover of each earphone. The loudspeaker covers of the earphones will therefore not be damaged.

(13) The earphone cord 21 or 20 utilizes as a cord guide groove the groove sandwiched by the ribs 27a or 25a of the right or left frame 27 or 25 which includes the portion of the groove covered with the adjuster 28 or 26. The earphone cords are therefore reliably held but not sag while the HMD is carried or stored. While the HMD is used for viewing, the earphone cords will not sag very much. The earphone cords sag at proper positions near the ears. Thus, the HMD would be found user-friendly.

(14) The neatness in settlement of the earphone cords 21 and 20 in the frames has improved owing to the coil spring portions thereof. The coil spring portions can prevent the earphone cords from floating above the cord passage grooves 27h and 25h.

(15) If the HMD 1 is taken off from the head with the earphones 7 and 6 left inserted in the ears, the coil spring portions of the earphone cords 21 and 20 stretch. The conductors of the cords can be prevented from being disconnected. Moreover, a user will not have a pain in the ears.

As mentioned above, according to the present invention, there is provided a head-mounted image display device (HMD) that is compact and easily worn on the head. Right and left components of the HMD can be realized using a common member and formed strong enough. Earphones are easy to use. Thus, the user-friendly and low-cost HMD is provided.

What is claimed is:

1. A head-mounted image display device having an image producing unit which includes an image display means and a projecting optical system for projecting an image produced by said image display means on an observer's eyes, said head-mounted image display device comprising:

a casing body in which said image producing unit is incorporated;

a pair of frame supporting members fixed to said casing body;

a pair of frame members for wearing said head-mounted image display device on a head supported by said pair of frame supporting members so that said frame members can pivot freely; and frame spreading magnitude changing devices attached to said frame members so that said head-mounted image display device can move relative to said frame members to adjust an angle of pivot by which said frame members pivot;

wherein said frame spreading magnitude changing devices move relative to said frame members so that said head-mounted image display device will have distal projections thereof inserted into and withdrawn from gaps between contacting portions of said frame supporting members and said contacting portions of said frame members, whereby a pivot angle by which said frame members can pivot is adjusted at least in two steps.

2. The head-mounted image display device according to claim 1, wherein:

said frame spreading magnitude changing devices are realized with a pair of members, said pair of members are a same shape.

3. The head-mounted image display device according to claim 1, wherein:

said frame members has a plurality of ribs lined in a width direction on an outer surface thereof that faces outside with respect to said head-mounted image display device worn on said head, said plurality of ribs are extended over an effective range in a longitudinal direction of said frame members;

said frame spreading magnitude changing devices are attached to cover said plurality of ribs; and a groove defined with said plurality of ribs and having a portion thereof covered by said frame spreading magnitude changing devices is used as an earphone cord passage groove.

4. A head-mounted image display device having an image producing unit which includes an image display means and a projecting optical system for projecting an image produced by said image display means on an observer's eyes, said head-mounted image display device comprising:

a casing body in which said image producing unit is incorporated;

a pair of frame supporting members fixed to said casing body;

a pair of frame members for wearing said head-mounted image display device on a head supported by said pair of frame supporting members so that said frame members can pivot freely; and frame spreading magnitude changing devices attached to said frame members allowing said head-mounted image display device to move relative to said frame members to adjust a pivot angle by which said frame members can pivot;

wherein said frame spreading magnitude changing devices move relative to said frame members so that said head-mounted image display device will have distal projections thereof inserted into and withdrawn from gaps between contacting portions of said frame supporting members and said contacting portions of said frame members, whereby a pivot angle by which said frame members can pivot is adjusted to any position lacking a stepwise specified position.

5. A head-mounted image display device having an image producing unit which includes an image display means and a projecting optical system for projecting an image produced by said image display means, on an observer's eyes, said head-mounted image display device comprising:

a casing body in which said image producing unit is incorporated;

a pair of frame supporting members fixed to said casing body; and a pair of frame members for wearing said head-mounted image display device on a head supported by said frame supporting members allowing said frame members to pivot freely;

wherein said frame members have a distal portion shifted down by a predetermined dimension with respect to a major axis plane (PI) defined in a proximal portion of said frame members acting as a fulcrum.

6. The head-mounted image display device according to claim 5, wherein:

said paired frame members and said paired frame supporting members can be replaced with each other.

\* \* \* \* \*